United States Patent
Nguyen (10) Patent No.: US 9,584,039 B2
(45) Date of Patent: Feb. 28, 2017

(54) REGULATED AC-DC HYBRID RECTIFIER

(71) Applicant: HAMILTON SUNDSTRAND CORPORATION, Charlotte, NC (US)

(72) Inventor: Vietson M. Nguyen, Rockford, IL (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 171 days.

(21) Appl. No.: 14/288,150

(22) Filed: May 27, 2014

(65) Prior Publication Data
US 2015/0349658 A1 Dec. 3, 2015

(51) Int. Cl.
| | |
|---|---|
| *H02M 1/12* | (2006.01) |
| *H02M 7/06* | (2006.01) |
| *H02M 1/14* | (2006.01) |
| *H02M 1/42* | (2007.01) |
| *H02M 7/08* | (2006.01) |

(52) U.S. Cl.
CPC ............... *H02M 7/06* (2013.01); *H02M 1/12* (2013.01); *H02M 1/14* (2013.01); *H02M 1/4216* (2013.01); *H02M 1/4225* (2013.01); *H02M 7/08* (2013.01); *Y02B 70/126* (2013.01)

(58) Field of Classification Search
CPC ............ H02M 1/12; H02M 1/14; H02M 1/42; H02M 7/06; H02M 7/08; H02M 1/4216; H02M 1/4225; Y02B 70/126
USPC .......................................................... 363/84
See application file for complete search history.

(56) References Cited

U.S. PATENT DOCUMENTS

| | | | | |
|---|---|---|---|---|
| 5,515,261 A | * | 5/1996 | Bogdan ............... | H02M 1/4225 323/222 |
| 5,615,098 A | * | 3/1997 | Ishii ....................... | H02M 1/12 363/84 |
| 6,038,152 A | * | 3/2000 | Baker .................... | H02M 7/219 363/126 |
| 6,055,167 A | * | 4/2000 | Shamkovich ....... | H02M 1/4225 323/300 |

(Continued)

FOREIGN PATENT DOCUMENTS

EP 2720357 4/2014

OTHER PUBLICATIONS

Kurt Schenk and Andrzej Pietkiewicz; Novel Low Harmonic Rectifier Using 12-Pulse Inductive Current Splitter/Merger; IEEE APEC 2013 Conference Records, pp. 978-985.*

(Continued)

*Primary Examiner* — Timothy J Dole
*Assistant Examiner* — Htet Z Kyaw
(74) *Attorney, Agent, or Firm* — Snell & Wilmer L.L.P.

(57) ABSTRACT

A regulated hybrid AC-DC rectifier employing a boost stage is disclosed herein. The regulated hybrid AC-DC rectifier comprises a 12 pulse inductive current splitter/merger (CSM) system coupled to a boost stage. The boost stage may be regulated using a PWM controller. The regulated hybrid AC-DC rectifier may further include a three phase input filter configured to regulate the harmonic content of the AC-DC hybrid converter within a desired limit. The regulated hybrid AC-DC rectifier may further comprise a notch filter system configured to tune out harmonic ripples at known intervals, such as $11^{th}$ and $13^{th}$ order harmonics.

14 Claims, 12 Drawing Sheets

(56) References Cited

U.S. PATENT DOCUMENTS

| | | | | |
|---|---|---|---|---|
| 6,122,183 | A * | 9/2000 | He | H02M 1/4216 323/222 |
| 7,095,636 | B2 * | 8/2006 | Sarlioglu | H02M 1/126 363/39 |
| 7,310,250 | B2 * | 12/2007 | Lee | H02M 7/08 363/52 |
| 7,733,678 | B1 * | 6/2010 | Notohamiprodjo | H02M 1/4225 323/222 |
| 8,432,713 | B2 * | 4/2013 | Popescu | H02M 1/4225 323/285 |
| 8,687,388 | B2 * | 4/2014 | Jang | H02M 1/4216 363/44 |
| 8,891,261 | B2 * | 11/2014 | Jang | H02M 1/4216 363/44 |
| 9,106,143 | B2 * | 8/2015 | Kittel Riel | H02M 3/33507 |
| 9,153,376 | B2 * | 10/2015 | Pietkiewicz | H02M 1/126 |
| 2004/0178746 | A1 * | 9/2004 | Nemirow | H05B 41/2856 315/291 |
| 2004/0202012 | A1 * | 10/2004 | Ferens | H02M 7/08 363/65 |
| 2006/0056207 | A1 * | 3/2006 | Sarlioglu | H02M 1/126 363/44 |
| 2007/0019442 | A1 * | 1/2007 | Li | H02J 1/08 363/15 |
| 2013/0057297 | A1 * | 3/2013 | Cheng | H02M 1/32 324/548 |
| 2013/0082636 | A1 * | 4/2013 | Ohori | H02P 4/00 318/723 |
| 2013/0127353 | A1 * | 5/2013 | Athalye | H05B 33/0815 315/193 |
| 2015/0097506 | A1 * | 4/2015 | Feng | H02M 7/06 318/504 |
| 2015/0355325 | A1 * | 12/2015 | Bechhoefer | G01S 13/70 342/118 |

OTHER PUBLICATIONS

Mino, Gong and Kolar; Novel Hybrid 12-Pulse Boost Type Rectifier with Controlled Output Voltage; IEEE Trans on Aerospace and Electronic Systems, vol. 41, No. 3, Jul. 2005.

G. Gong, U. Drofenik and J.W. Kolar; 12-Pulse Rectifier for More Electric Aircraft Applications; Industrial Technology, 2003 IEEE International Conference; pp. 1096-1101 vol. 2.

Guanghai Gong, M.L. Heldwein, U. Drofenik, J. Minibock, K. Mino, J.W. Kolar; Comparative evaluation of three-phase high-power-factor AC-DC converter concepts for application in future More Electric Aircraft; Industrial Electronics, IEE Transactions on (vol. 52, Issue: 3); Jun. 2005; pp. 727-737.

MTE Corporation; Performance of Harmonic Mitigation Alternatives; http://www.mtecorp.com/pages/wp-content/uploads/mitigation.pdf.

Square D; Power System Harmonics—Causes and Effects of Variable Frequency Drives Relative to the IEEE 519-1992 Standard; Bulletin No. 8803PD9402, Aug. 1994; http://static.schneider-electric.us/docs/Motor%20Control/AC%20Drives/8803PD9402.pdf.

Extended European Search Report dated Oct. 12, 2015 in European Application No. 15168107.9.

Kusko A et al: "Application of 12-Pulse Converters to Reduce Electrical Interference and Audible Noise From DC Motor Drives", IEEE Transactions on Industry Applications, IEEE Service Center, Piscataway, NJ, US, vol. 29, No. 1, Jan. 1, 1993 (Jan. 1, 1993), pp. 153-160.

Duro Basic et al: "Harmonic Filtering of High-Power 12-Pulse Rectifier Loads With a Selective Hybrid Filter System", IEEE Transactions on Industrial Electronics, IEEE Service Center, Piscataway, NJ, USA, vol. 48, No. 6, pp. 1118 and1123, Dec. 6, 2001.

\* cited by examiner

REGULATED AC-DC HYBRID RECTIFIER

FIELD

The present disclosure relates to an electrical device that converts alternating current (AC), which periodically reverses direction, to direct current (DC), which in general flows in one direction.

BACKGROUND

Historically, in various applications, such as those used in vehicles, (e.g., aircraft), AC-DC conversion is used to provide power to various systems. Two types of rectifiers have been implemented, active rectifiers and passive rectifiers. Examples of active rectifiers include a two-level active rectifier, such as a two-level active rectifier configured to convert a three-phase voltage source into a single regulated DC voltage source with a controllable input power factor. Additionally, active rectifiers include three-level active rectifiers, such as a Vienna rectifier. A Vienna rectifier may be configured to convert a three-phase input voltage into a regulated dual DC-bus voltage source with a controllable input side power factor. Examples of passive rectifiers may include an auto-transformer rectifier unit and AC-Side inductive power transfer-based harmonic rectifier. In general, a passive rectifier is completely passive, meaning the output voltage depends on the component values, and the passive rectifier is not capable of being regulated.

SUMMARY

According to various embodiments, a regulated hybrid AC-DC rectifier employing a boost stage is disclosed herein. The regulated hybrid AC-DC rectifier comprises a 12 pulse inductive current splitter/merger (CSM) system coupled to a boost stage. The boost stage may be regulated using a PWM controller. The regulated hybrid AC-DC rectifier may further include a three phase input filter configured to regulate the harmonic content of the AC-DC hybrid converter within a desired limit. The regulated hybrid AC-DC rectifier may further comprise a notch filter system configured to tune out harmonic ripples at known intervals, such as $11^{th}$ and $13^{th}$ order harmonics.

According to various embodiments, a regulated AC-DC hybrid rectifier system including an AC-side coupled interphase transformer (IPT) based passive rectifier, and a boost stage is disclosed. The output of the IPT-based passive rectifier may be input to a boost stage. The boost stage may include a Pulse width modulated (PWM) controller, a boost switch, and a boost diode. The output of the PWM controller may be coupled to the input of the boost switch. A switching duty of the boost switch may be varied by the PWM controller to maintain a substantially constant DC output voltage. The boost diode may be coupled to the output of the boost switch.

According to various embodiments, a method of converting alternating current (AC) to direct current (DC) is disclosed. The method may include filtering an AC input power source and absorbing a $n^{th}$ order harmonic ripple of interest via a notch filter. The method may include passively rectifying, by an AC-side coupled IPT-based passive rectifier, the filtered AC input current to DC current. The method may include boosting the output of the IPT-based passive rectifier and sensing the boosted output voltage. The method may include inputting the sensed output voltage to a PWM controller and modulating the switching duty of a boost switch in response to the sensed load. The modulating of the switching duty may be configured to maintain a substantially constant DC output voltage at the load.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration and their best mode. While these exemplary embodiments are described in sufficient detail to enable those skilled in the art to practice the disclosure, it should be understood that other embodiments may be realized and that logical changes may be made without departing from the spirit and scope of the disclosure. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step.

Figure 1:
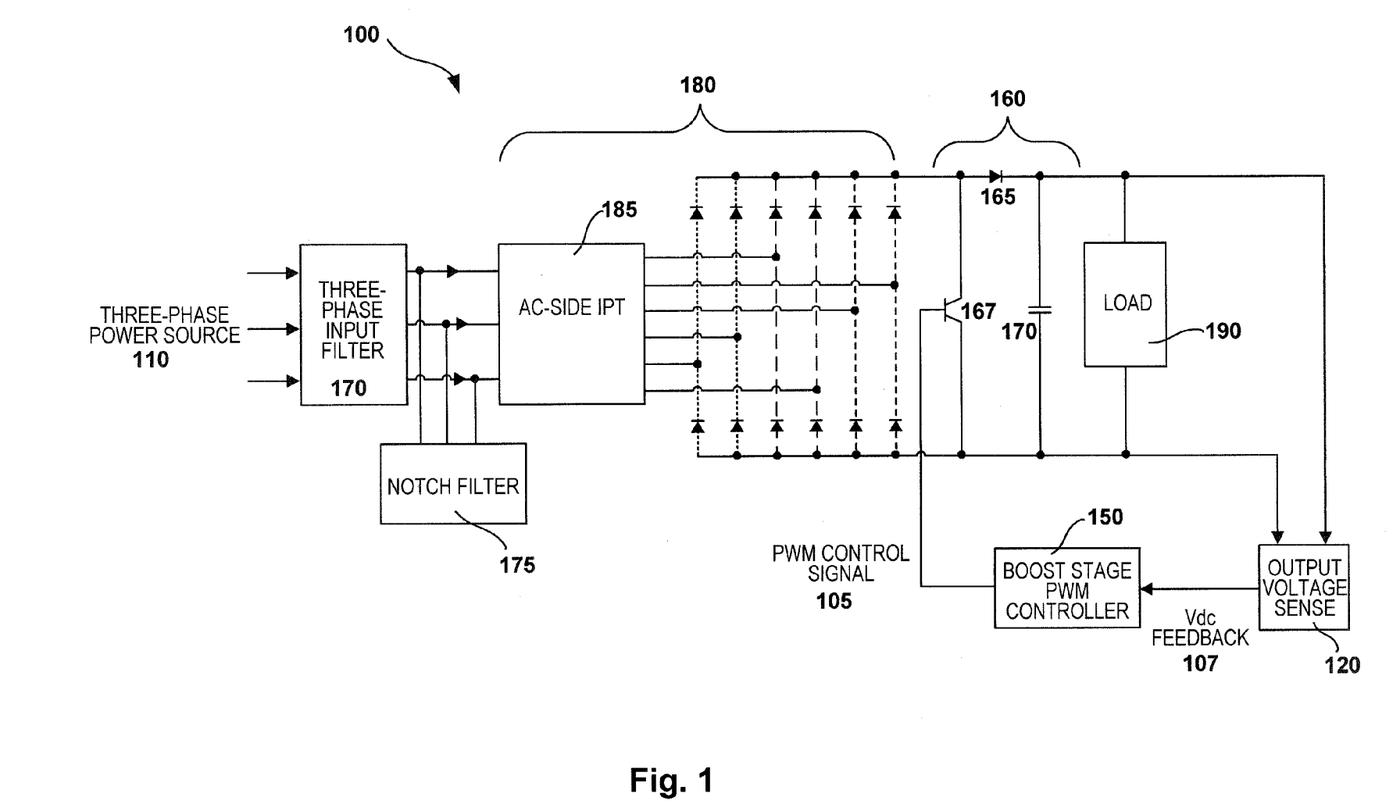
FIG. 1 is a representative diagram of a regulated hybrid AC-DC rectifier employing a boost stage at the output in accordance with various embodiments.

According to various embodiments and with reference to FIG. 1 a diagram of a regulated hybrid AC-DC rectifier 100 employing a boost stage 160 is depicted. As used herein, the word "hybrid" may be used to indicate it may include both passive (e.g., magnetic and rectifier) and active (e.g., PWM switching device) elements. The general topology of the regulated hybrid AC-DC rectifier 100 comprises a 12 pulse inductive current splitter/merger (CSM) system 180 coupled to a boost stage 160. The boost stage 160 may be regulated using a PWM controller 150. For instance, the boost stage PWM controller 150 may be coupled to the output of the CSM system 180. The regulated hybrid AC-DC rectifier 100 may further comprise a three phase input filter 170 configured to regulate the harmonic content of the regulated hybrid AC-DC rectifer 100 within a desired limit. According to various embodiments, the regulated hybrid AC-DC rectifier 100 may further comprise a notch filter system 175 configured to tune out harmonic ripples at known intervals, such as $11^{th}$ and $13^{th}$ order harmonics. A harmonic is a component of a periodic wave having a frequency that is an integral multiple of the fundamental input frequency. Stated another way harmonics may be multiples of a fundamental frequency.

According to various embodiments with continued reference to FIG. 1, the 12 pulse inductive (CSM) system 180 may comprise a AC-side IPT system 185 coupled to a AC power source 110 and a diode network 187. The AC-side interphase transformer system 185 may comprise 3 single phase coupled inductors.

Figure 2:
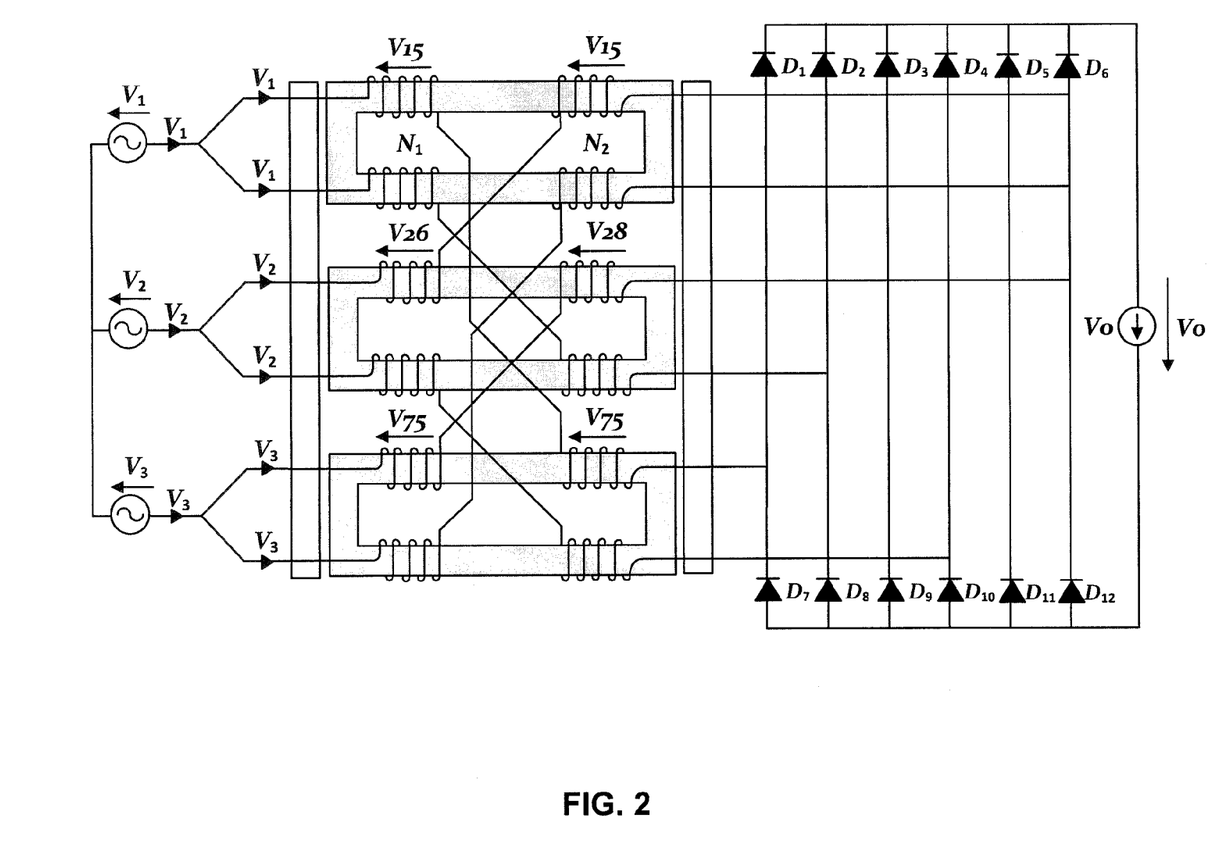
FIG. 2 is a representative diagram of a interphase transformer in accordance with various embodiments.

According to various embodiments, the AC-side interphase transformer system 185 may take the form of the low harmonic rectifier of FIG. 2. As can be seen, the number of turns on each leg of the ungapped core may be substantially identical, N1 on the left and N2 on the right hand side of FIG. 2.

According to various embodiments, the boost stage 160 may comprise a boost diode 165, a boost switch 167, boost stage controller 150, a filter capacitor 130, and/or an output voltage sensor 120 configured sense the output voltage at the load 190. The boost stage 160 may be configured to control the output DC voltage at a desired level. The Vdc feedback sensed by the voltage sensor 120 may be input to PWM controller 150. The PWM controller may send a PWM control signal 105 to boost switch 167 to effectively toggle operation of boost diode 165.

In operation, three phase input filter 170 may be configured to be utilized in a constant-frequency, such as 400 Hertz (Hz) application. Since the main harmonics in 400 Hz applications are the 11th (4400 Hz) order harmonic and the 13th (5200 Hz) order harmonic, two notch filters that comprise notch filter system 175 may be configured to absorb these harmonics to result in a reduced total harmonic distortion profile of the input current.

In general, the worst case of low input AC voltage for aircraft applications (either 400 Hz in Constant Frequency systems or 360-650 Hz or 360-800 Hz in variable frequency systems), for example 105 Vac L-N, the output DC voltage is around 220 to 230 Vdc. A boost stage 160 at the DC output (e.g., load 190) may be configured to increase the output voltage to a higher level, for example about 270 Vdc or 330 Vdc. This higher voltage level may be regulated by applying the PWM controller 150. In this way the regulated hybrid AC-DC rectifier 100 and more specifically the output voltage sensor 120 may sense the output voltage and feedback the value to PWM controller 150. PWM controller 150 may increase or decrease the switching duty-cycle in response to the load varying to maintain the DC output voltage at a constant level. Without filtering at the input side, the input current may vary substantially proportional to the load current. As previously mentioned, the two major harmonic components of the input currents are the 11th and 13th harmonics while the other important component is the high-frequency current ripple caused by PWM switching. In this case, the switching frequency may be selected as desired depending on the efficiency as well as the availability and characteristics of the available power switching device. In general, a switching frequency from 20 kHz to 100 kHz may be appropriate for medium and high power operation (1 kW up to 35 kW) with the topolog of regulated hybrid AC-DC rectifier 100.

A boost switch 167, such as a bipolar junction transistor or field effect transistor, at the output of the PWM controller 150 may be directed by PWM control signal 105. For instance, PWM controller 150 (e.g., voltage regulator) circuitry may be enacted such that the duty cycle of boost switch 167 is varied to keep the output voltage constant (regulated). In variable frequency applications, a 3-phase input filter 170 may be utilized to maintain the harmonic content of the regulated hybrid AC-DC rectifier 100 within a limit. A specification to specify test conditions for the design of avionics electronic hardware in airborne systems, for example DO-160, may impose a boundary for selecting the components for the three-phase input filter 170. An input filter 170, such as an inductor-capacitor-inductor (LCL) filter, may be configured to perform high-frequency ripple current filtering. The first inductor may be connected in parallel with an inductor-resistor damper to downwardly damp the switching frequency current ripple. The capacitor may be selected with a corresponding resistor-capacitor damper circuit. The last/second inductor may be connected to the external three phase power source 110.

According to various embodiments, regulated hybrid AC-DC rectifier 100 is well suited for an aircraft's constant frequency 400 Hz power system. In the case of using 400 Hz, since the ripple harmonic frequencies can be predetermined, some notch filters can be designed and inserted to the middle of the LCL filter to short-circuit the harmonic currents at known predetermined frequencies. The input current may appear to be nearly "harmonic free" (See FIGS. 5A-6C). For instance, the notch filters 175 may be designed to filter out 11th and 13th harmonics which are more predominant in a 400 Hz constant frequency application. At 400 Hz, the 11th and 13th harmonics are 4400 and 5200 Hz, respectively.

According to various embodiments, IPT 185 comprising three single-phase coupled inductors is lighter and has a more compact footprint than the conventional 12-pulse passive rectifier approach. Regulated hybrid AC-DC rectifier 100 does not utilize a DC-Side IPT. The output voltage can be well regulated to provide a higher output voltage 270 Vdc or 350 Vdc as compared with the 220 Vdc in a conventional passive mode. For aircraft applications, constant frequency 400 Hz system, power quality of input current can be better controlled using a LCL filter with two notches designed to short-out the 11th and 13th harmonic current components.

Figure 3A:
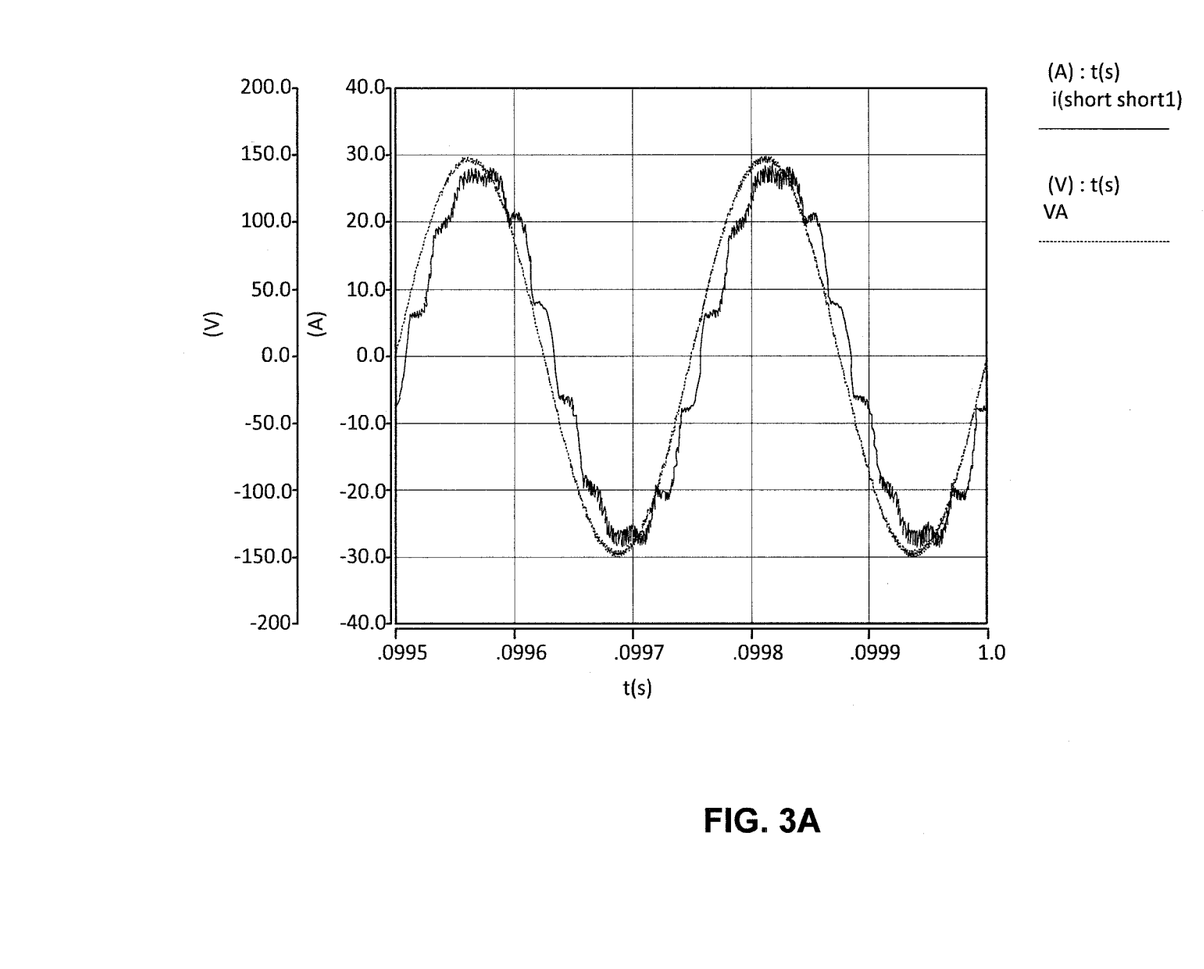
FIGS. 3A and 3B depict simulation results in a case having no input filter at 400 Hertz constant frequency.
Figure 3B:
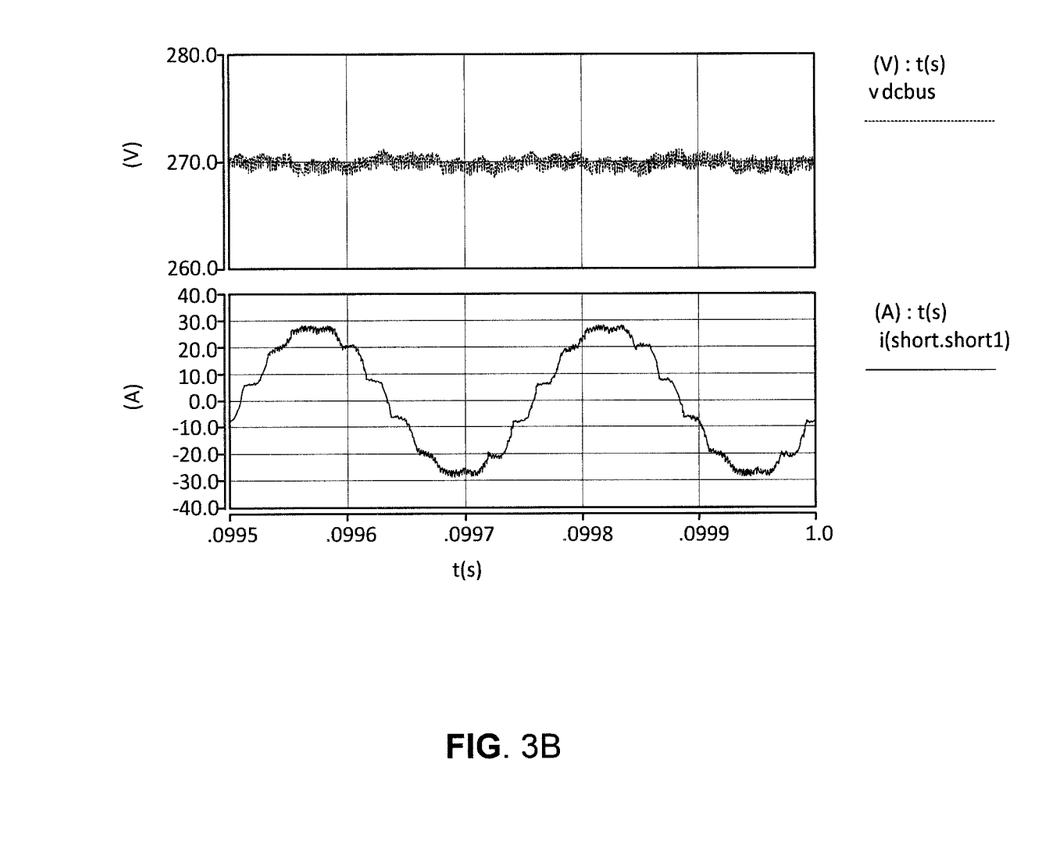
Figure 3C:
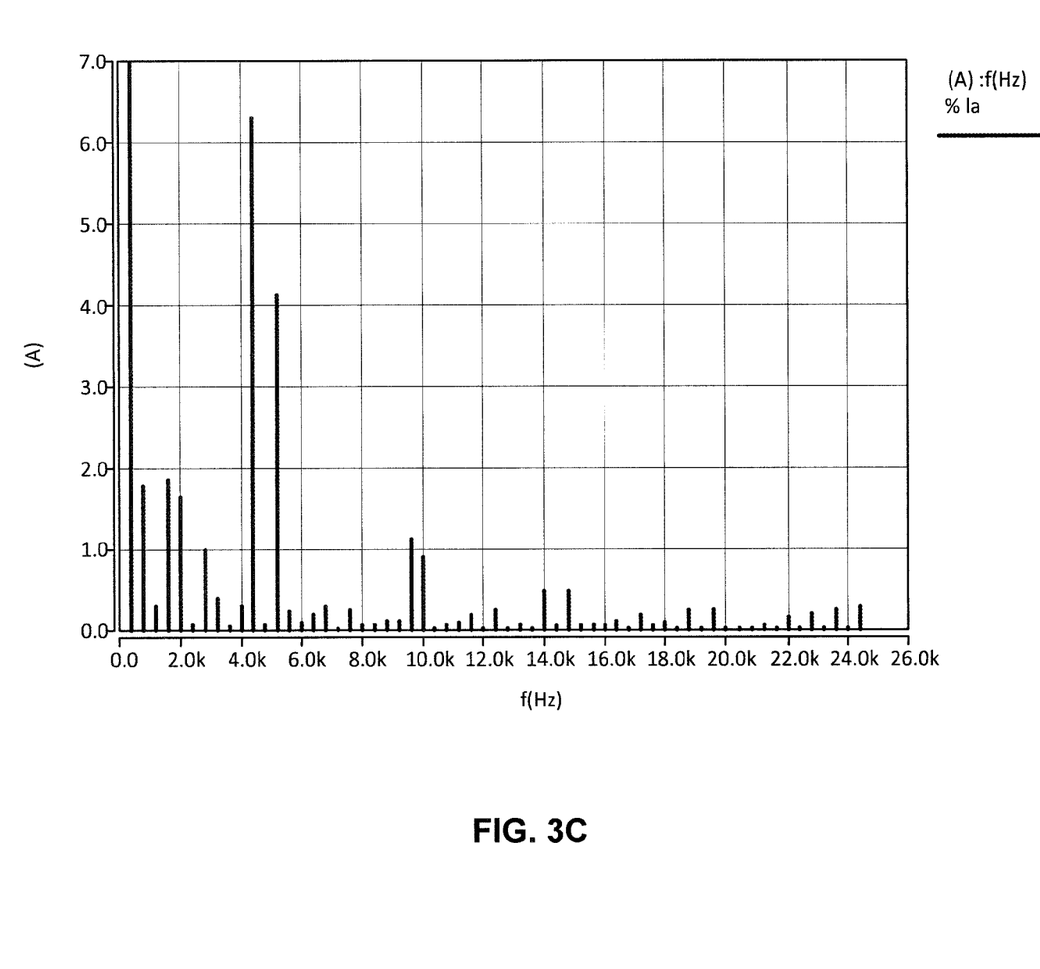
FIG. 3C depicts simulation results illustrating the spectrum of input current in accordance with various embodiments.

According to various embodiments, FIGS. 3A and 3B depict simulation results in a case having no input filter at 400 Hz constant frequency and 105 volts AC input. FIG. 3A depicts the simulation of input voltage and current vs time. FIG. 3B depicts the simulation of a regulated DC bus output voltage and input current. FIG. 3C depicts simulation results illustrating the spectrum of input current in accordance with various embodiments. Without an input filter, beside the ripple current at the switching frequency, the 11th and $13^{th}$ harmonics are dominant.

Figure 4:
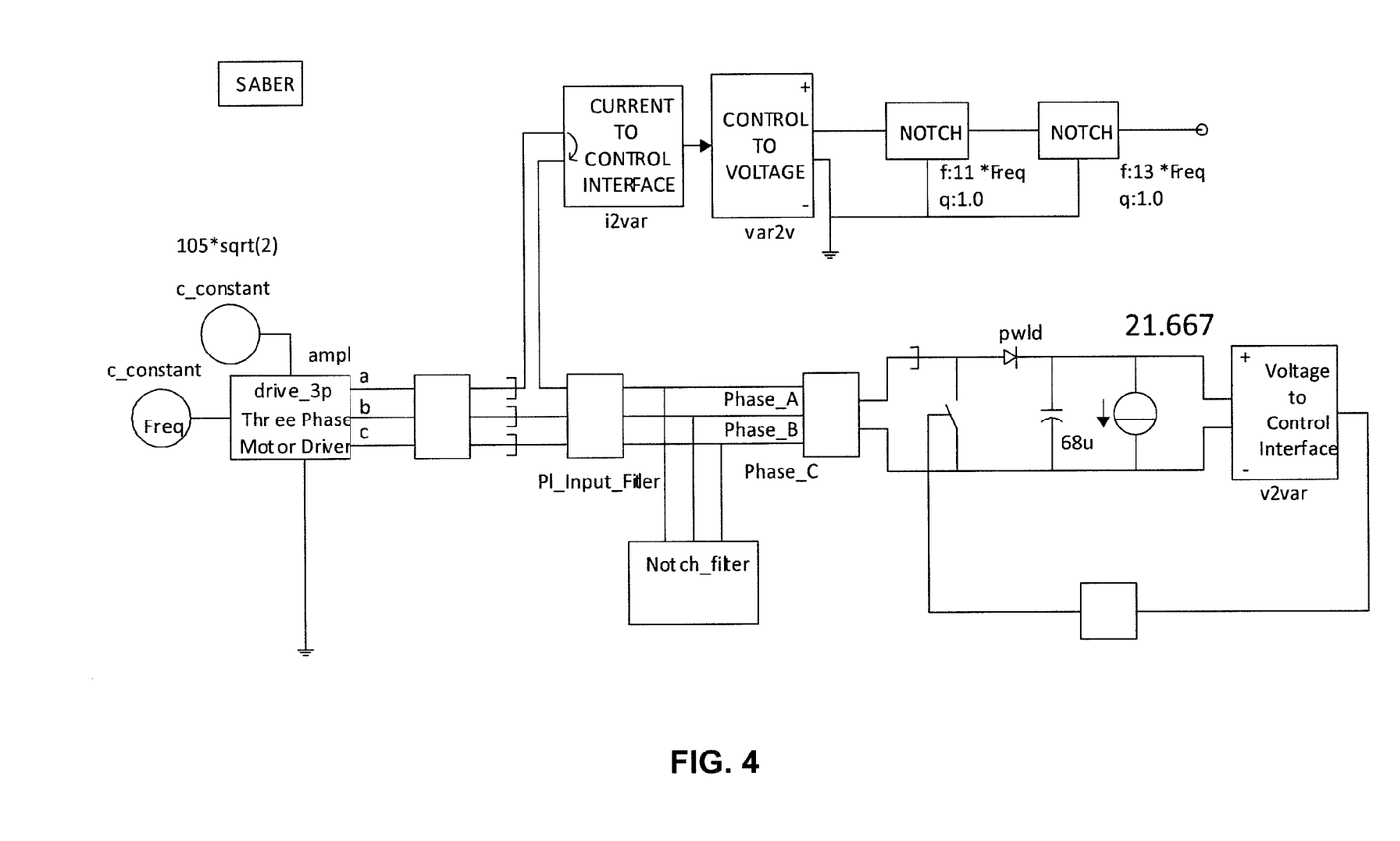
FIG. 4 is a representative Saber™ model of a regulated hybrid AC-DC rectifier at 400 Hertz constant frequency in accordance with various embodiments.

FIG. 4 depicts a representative Saber™ model of a regulated hybrid AC-DC rectifier at 400 Hertz constant frequency in accordance with various embodiments. The switching frequency in the boost stage may be set to 50 kHz. An Input filter is inserted with two notches at 4.4 kHz and 5.2 kHz. The LCL input filter is simulated using 25 μH, 2 mΩ Inductors with a 2.5 μF capacitor. The value of the capacitor may be varied and/or a resistor-capacitor damper can be added.

Figure 5A:
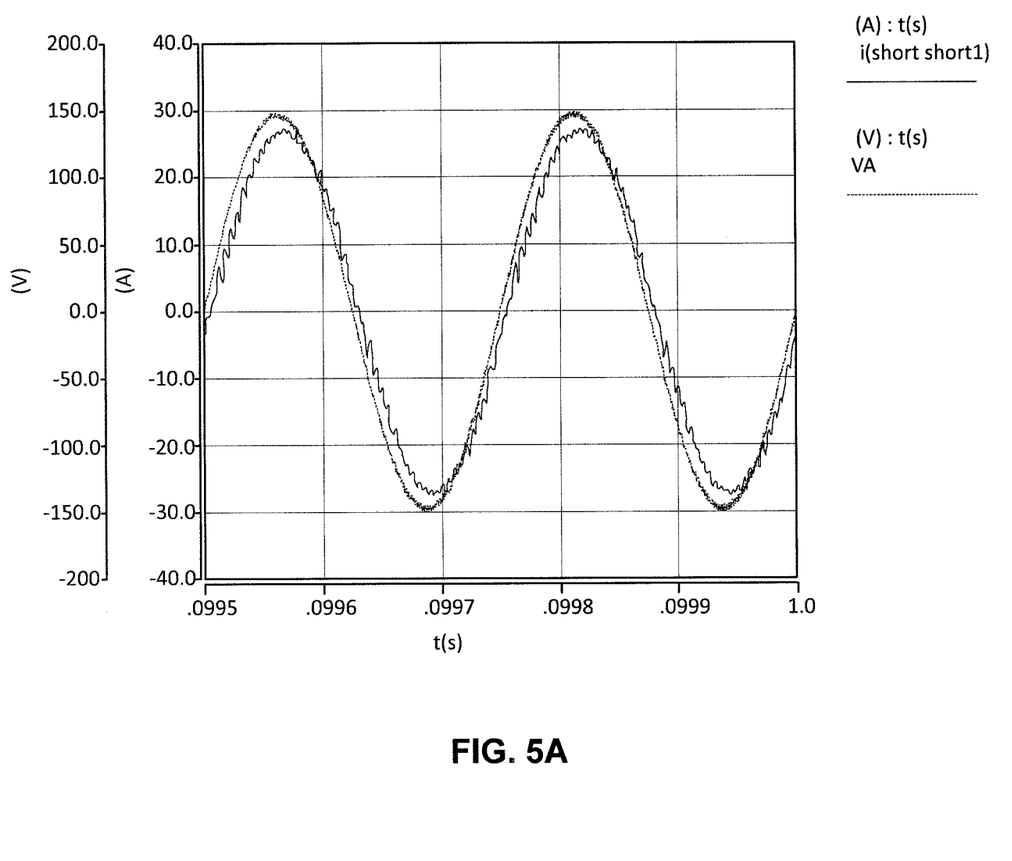
FIGS. 5A and 5B depict simulation results in a case comprising an input side notch filter at 400 Hertz constant frequency, full load in accordance with various embodiments.
Figure 5B:
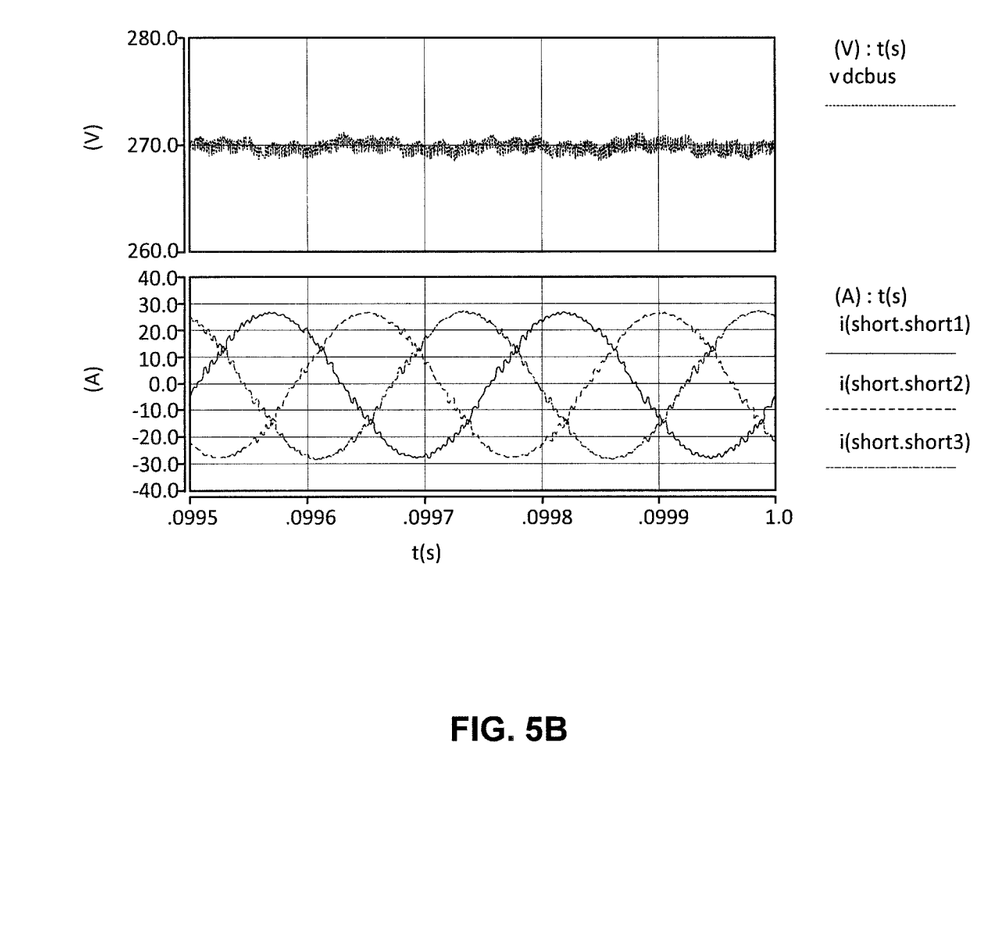
Figure 5C:
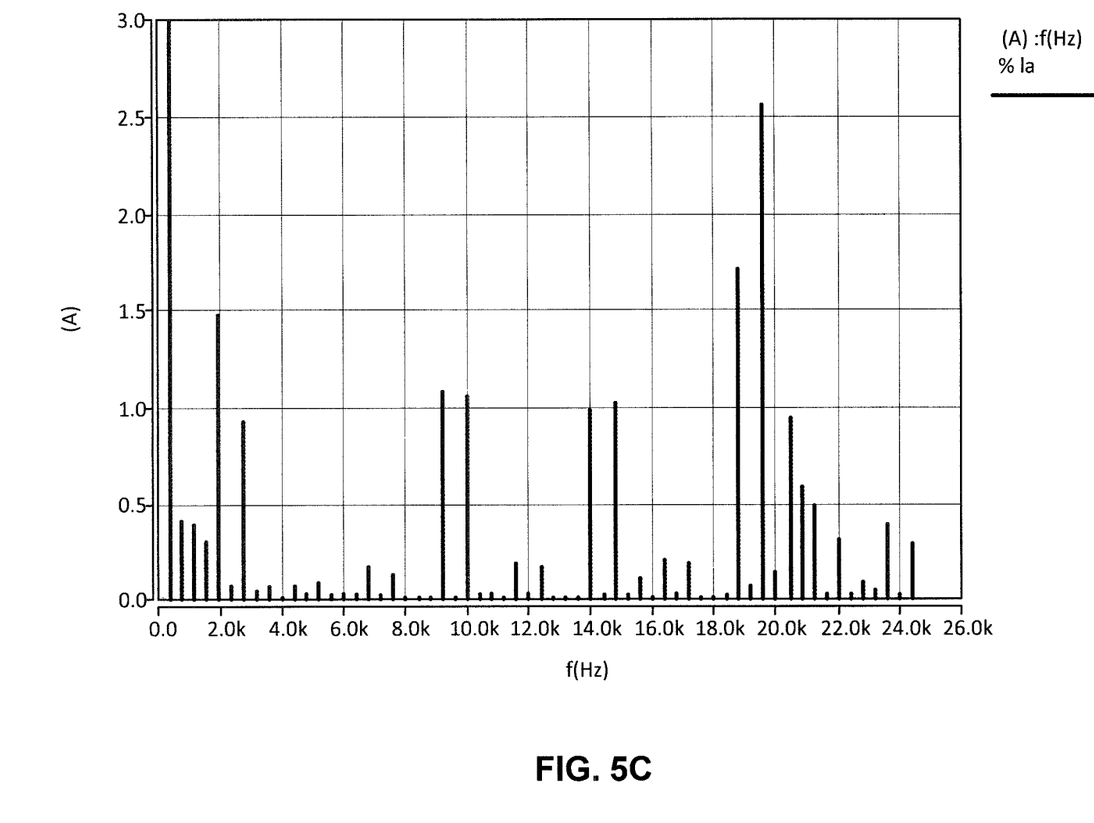
FIG. 5C depicts simulation results illustrating the harmonic spectrum of input current in percentage of the fundamental current at full load in accordance with various embodiments.

FIGS. 5A and 5B depict simulation results in a case comprising an input side notch filter at 400 Hertz constant frequency, full load in accordance with various embodiments. At full load, the current sink is 21.667 A. FIG. 5A depicts the simulation of input voltage and current vs time. A small phase shift is noticed. The power factor is near unity. FIG. 5B depicts the regulated DC bus at 270 V and three-phase input currents. Notably, using notch filters at the input side as shown results in waveforms with less disturbances. FIG. 5C depicts simulation results illustrating the harmonic spectrum of input current in percentage of the fundamental current at full load in accordance with various embodiments.

Figure 6A:
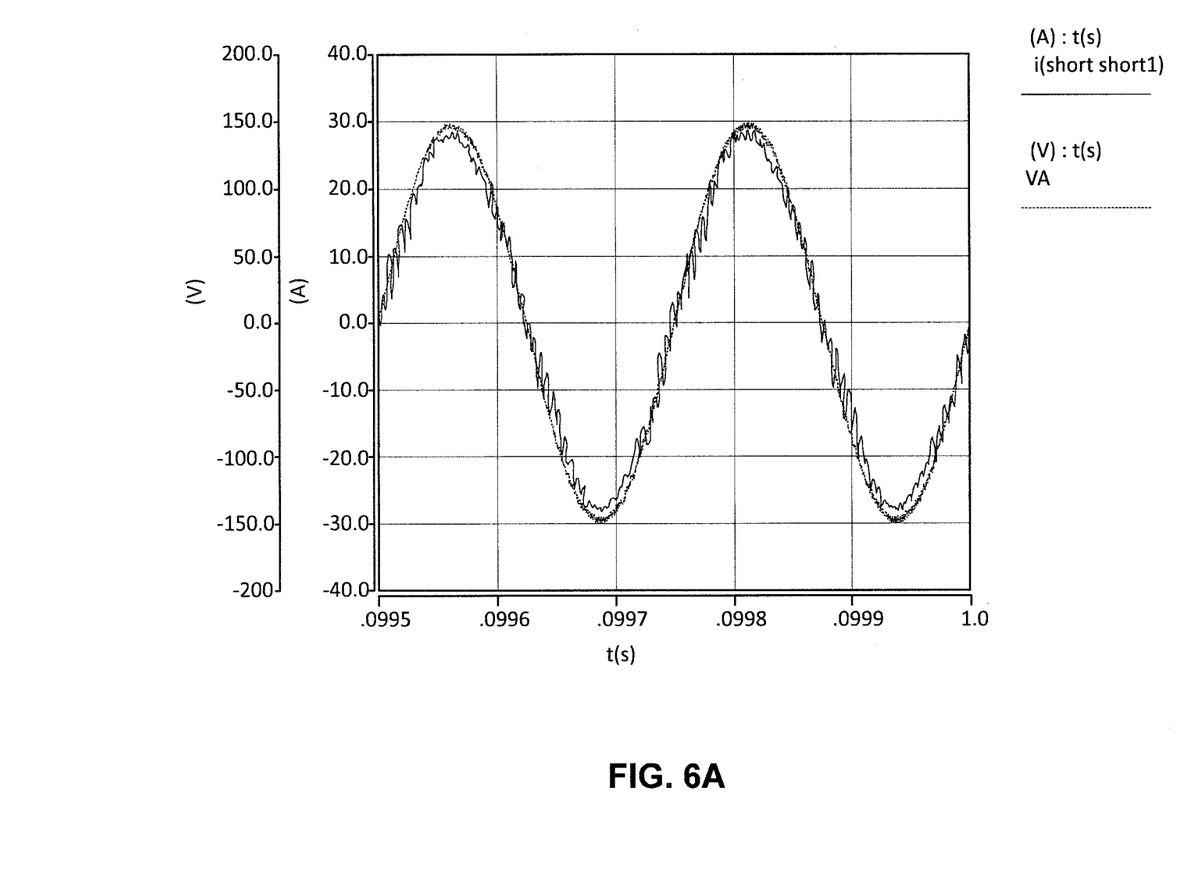
FIGS. 6A and 6B depict simulation results in a case comprising an input side notch filter at 400 Hertz constant frequency, half load in accordance with various embodiments.
Figure 6B:
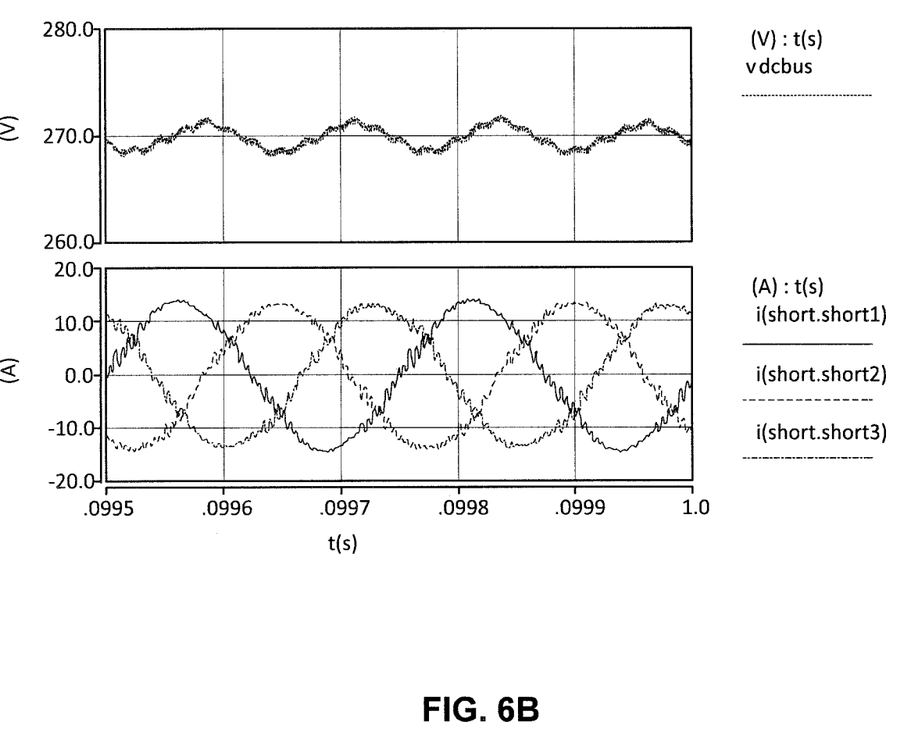
Figure 6C:
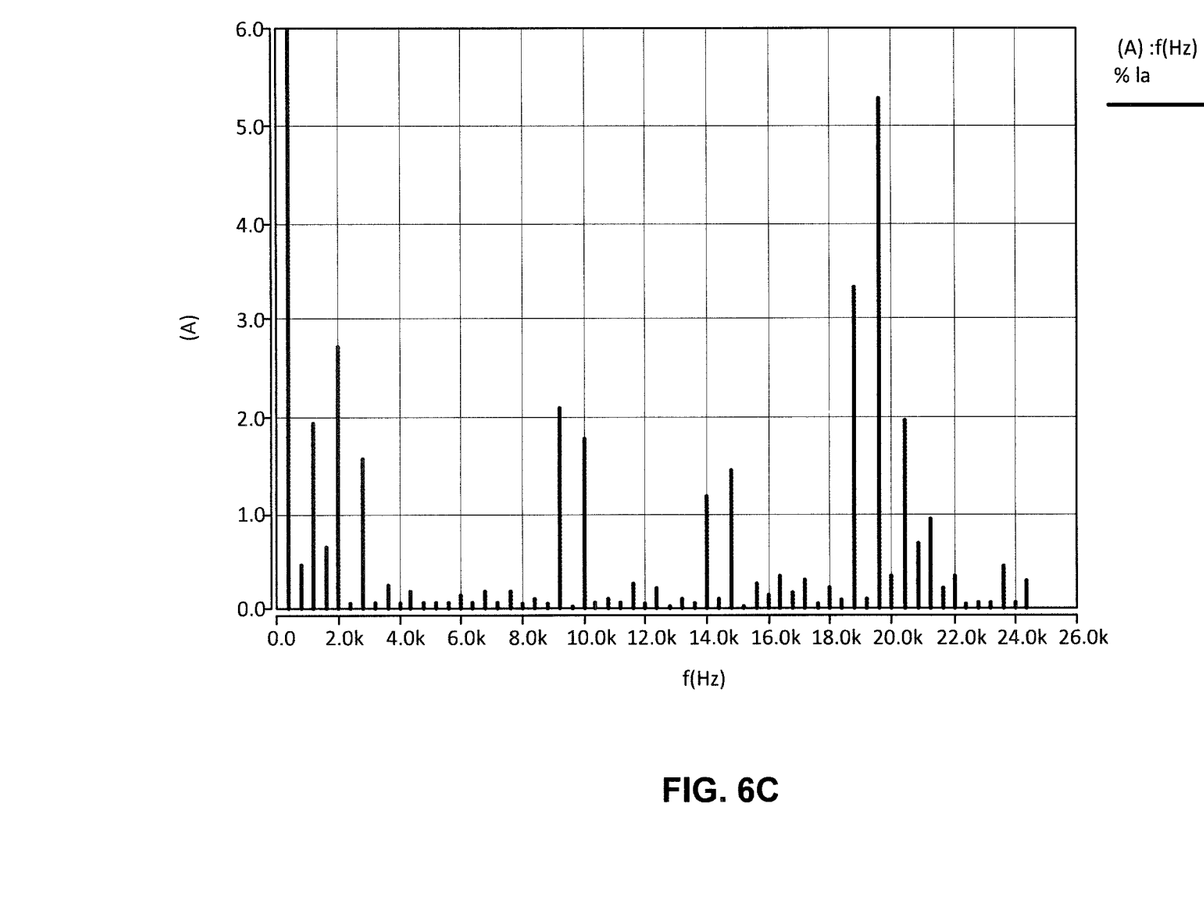
FIG. 6C depicts simulation results illustrating the harmonic spectrum of input current in percentage of the fundamental current at half load in accordance with various embodiments.

FIGS. 6A and 6B depict simulation results in a case comprising an input side notch filter at 400 Hertz constant frequency, full load in accordance with various embodiments. At half load, the current sink is 10.8335 A. FIG. 6A depicts the simulation of input voltage and current vs time. A small phase shift is noticed. The power factor is near unity. FIG. 6B depicts the regulated DC bus at 270 V and three-phase input currents. FIG. 6C depicts simulation results illustrating the harmonic spectrum of input current in percentage of the fundamental current at half load in accordance with various embodiments.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments. Different cross-hatching is used throughout the figures to denote different parts but not necessarily to denote the same or different materials.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A regulated AC-DC hybrid rectifier system comprising:
   an AC-side coupled interphase transformer (IPT) based passive rectifier, wherein the IPT-based passive rectifier comprises a low harmonic rectifier coupled to a diode network, wherein an output of the diode network is an input to a boost stage, wherein the boost stage comprises:
     a pulse width modulated (PWM) controller, wherein an output of the PWM controller is coupled to an input of a boost switch,
     the boost switch, wherein a switching duty of the boost switch is varied by the PWM controller to maintain a substantially constant DC output voltage, and
     a boost diode coupled to an output of the boost switch;
   a voltage sensor coupled to the output of the boost switch, wherein an output of the voltage sensor is coupled to the PWM controller, wherein the PWM controller is configured to send a PWM control signal to the boost switch to toggle operation of the boost diode; and
   a first notch filter configured to absorb a first harmonic ripple at 4,400 Hz;
   a second notch filter configured to absorb a second harmonic ripple at 5,200 Hz, wherein an output of at least one of the first notch filter and the second notch filter is coupled to an input of the low harmonic rectifier.

2. The regulated AC-DC hybrid rectifier system of claim 1, further comprising a three phase input filter.

3. The regulated AC-DC hybrid rectifier system of claim 2, wherein the three phase input filter comprises a inductor-capacitor-inductor (LCL) filter.

4. The regulated AC-DC hybrid rectifier system of claim 1, wherein the harmonic ripple is the $11^{th}$ order harmonic.

5. The regulated AC-DC hybrid rectifier system of claim 1, wherein the IPT based passive rectifier comprises three single phase inductors.

6. The regulated AC-DC hybrid rectifier system of claim 1, wherein the IPT based passive rectifier comprises a 12 pulse inductive current splitter/merger (CSM).

7. The regulated AC-DC hybrid rectifier system of claim 1, wherein the regulated AC-DC hybrid rectifier system comports with specification to specify test conditions for the design of avionics electronic hardware in airborne systems.

8. The regulated AC-DC hybrid rectifier system of claim 1, wherein input power source is a variable frequency input power source.

9. The regulated AC-DC hybrid rectifier system of claim 1, wherein input power source is a constant frequency input power source.

10. A method of converting alternating current (AC) to direct current (DC) comprising:
  filtering an AC input power source;
  absorbing a harmonic ripple of interest at 4,400 Hz via a first notch filter;
  passively rectifying, by an AC-side coupled interphase transformer (IPT) based passive rectifier, the filtered AC input current to DC current;
  boosting the output of the IPT based passive rectifier;
  sensing the boosted output voltage;
  feeding the sensed output voltage to a PWM controller; and
  modulating the switching duty of a boost switch in response to the sensed load varying, wherein the modulating of the switching duty is configured to maintain a substantially constant DC output voltage at the load.

11. The method of converting alternating current (AC) to direct current (DC) of claim 10, wherein the filtering of the AC input power source is performed by an inductor-capacitor-inductor (LCL) filter.

12. The method of converting alternating current (AC) to direct current (DC) of claim 10, wherein the harmonic ripple of interest is the $11^{th}$ order harmonic.

13. The method of converting alternating current (AC) to direct current (DC) of claim 10, wherein the IPT based passive rectifier comprises three single phase inductors.

14. The method of converting alternating current (AC) to direct current (DC) of claim 10, wherein the IPT based passive rectifier comprises a 12 pulse inductive current splitter/merger (CSM).

* * * * *